United States Patent
Nathan et al.

(10) Patent No.: US 7,527,897 B2
(45) Date of Patent: May 5, 2009

(54) THREE-DIMENSIONAL THIN-FILM MICROBATTERY

(75) Inventors: Menachem Nathan, Tel Aviv-Jaffa (IL); Emanuel Peled, Even Yehuda (IL); Diana Golodnitsky, Rishon Lezion (IL); Ela Strauss, Bat-Yam (IL); Vladimir Yufit, Ashdod (IL); Tania Ripenbein, Netanya (IL); Inna Shechtman, Herzelia (IL); Svetlana Menkin, Petach Tikva (IL)

(73) Assignee: Tel Aviv University Future Technology Development L.P., Tel Aviv-Yafo (IL)

( * ) Notice: Subject to any disclaimer, the term of this patent is extended or adjusted under 35 U.S.C. 154(b) by 0 days.

(21) Appl. No.: 10/595,365

(22) PCT Filed: Oct. 14, 2004

(86) PCT No.: PCT/IL2004/000945

§ 371 (c)(1),
(2), (4) Date: Jun. 28, 2006

(87) PCT Pub. No.: WO2005/036711

PCT Pub. Date: Apr. 21, 2005

(65) Prior Publication Data

US 2007/0134549 A1 Jun. 14, 2007

Related U.S. Application Data

(60) Provisional application No. 60/511,382, filed on Oct. 14, 2003.

(51) Int. Cl.
*H01M 4/76* (2006.01)
(52) U.S. Cl. .................................................... 429/238
(58) Field of Classification Search ................. 429/304, 429/218.1, 231.95, 234, 238, 245; 219/216; 355/407, 40, 27
See application file for complete search history.

(56) References Cited

U.S. PATENT DOCUMENTS

| | | | |
|---|---|---|---|
| 4,659,637 A | 4/1987 | Nelson et al. | |
| 4,906,536 A | 3/1990 | Simonton | |
| 6,197,450 B1 | 3/2001 | Nathan et al. | |
| 6,260,388 B1 | 7/2001 | Borrelli et al. | |
| 6,270,714 B1 | 8/2001 | Azran et al. | |
| 6,300,709 B1 | 10/2001 | DeVoe et al. | |
| 6,521,149 B1 | 2/2003 | Mearini et al. | |

OTHER PUBLICATIONS

Hashikawa, et al., "Lithium Isotope Effect Accompanying Chemical Insertion of Lithium into Graphite", Zeitschrift fur Naturforschung 57a (2002), pp. 857-862.
U.S. Appl. No. 60/511,382, filed Oct. 14, 2003.

*Primary Examiner*—Patrick Ryan
*Assistant Examiner*—Thomas H. Parsons
(74) *Attorney, Agent, or Firm*—Darby & Darby P.C.

(57) ABSTRACT

An electrical energy storage device (20) includes a microchannel plate (MCP) (22) having channels (24) formed therein, the channels having surface areas. Thin films (26) are formed over the surface areas and define an anode (34,38), a cathode (34,38), and a solid electrolyte (36) disposed between the anode and the cathode.

18 Claims, 2 Drawing Sheets

THREE-DIMENSIONAL THIN-FILM MICROBATTERY

CROSS-REFERENCE TO RELATED APPLICATIONS

The above-referenced application is the U.S. National Phase of International Patent Application PCT/IL2004/000945, filed Oct. 14, 2004, which claims priority from U.S. Provisional Application No. 60/511,382, filed Oct. 14, 2003, which is incorporated by reference herein. The International application was published in English on Apr. 21, 2005 as WO 2005/036711 A2.

FIELD OF THE INVENTION

The present invention relates generally to electrical energy sources, and specifically to thin-film microbatteries.

BACKGROUND OF THE INVENTION

The above-mentioned U.S. Pat. No. 6,179,450 describes thin-film micro-electrochemical storage cells, such as microbatteries and double-layer capacitors. These cells are produced by depositing thin film electrode and solid electrolyte layers on a substrate that has a plurality of cavities etched therethrough with high aspect ratio (i.e., a high ratio of cavity depth to width). As a result of this design, the cells have a high total electrode area per unit volume, and thus high electrical capacity.

A microchannel plate (MCP) is a two-dimensional array of tubes of very-small diameter (commonly referred to as capillaries, or channels), which are fused together and sliced to form a thin plate. A typical MCP has several million independent channels. MCPs are widely used in detection of low-level radiation and electron signals, wherein each of the channels works as an independent electron multiplier. MCPs are commercially available from a number of different sources, such as Del Mar Ventures (San Diego, Calif.) and Burle Electro-Optics, Inc. (Sturbridge, Mass.).

MCPs are most commonly made from glass. The manufacturing process is described, for example, in an article entitled "Microchannel Plates and Microchannel Plate Detectors," published by Del Mar Ventures (available at www.sciner.com/MCP/MCP.htm, 2004), which is incorporated herein by reference. Briefly, the MCP begins as a glass tube fitted with a solid, acid-etchable core, which is drawn by fiberoptic techniques to form single fibers. A number of these fibers are stacked in an array, and the entire assembly is drawn again to form multi-fibers. The multi-fibers are then stacked together and fused at high temperature to form a boule. The boule is sliced on a wafer saw, edged to size, and then ground and polished as necessary. The individual slices are chemically processed to remove the solid core material, leaving a "honeycomb" structure of millions of tiny holes.

Other methods for MCP production are also known in the art. Some of these methods may be used to produce very fine MCP structures, as well as producing MCPs in materials other than glass. For example, U.S. Pat. No. 6,300,709 describes methods for making MCPs having micron and submicron apertures. U.S. Pat. No. 6,260,388 describes a method of making multi-channel waveguide structures using a combination of extruding and drawing techniques. U.S. Pat. No. 6,270,714 describes a method for potting or casting hollow fiber bundles together to form a tube sheet. This method may be used to form MCPs from various materials, such as carbon fibers. The disclosures of all of the above-mentioned patents are incorporated herein by reference.

SUMMARY OF THE INVENTION

In embodiments of the present invention, a three-dimensional storage cell, such as a microbattery, is produced by forming multiple thin film layers on a microchannel plate (MCP) structure. The thin film layers cover the inner surfaces of the microchannel tubes. Typically, the thin film layers also cover the upper and/or lower surfaces of the plate in order to provide electrical continuity of the layers over the entire MCP. In some embodiments, the layers inside the tubes completely fill the volume of the tube. The MCP may be made from glass or from other suitable materials, as described above, and the thin film layers may be deposited using a variety of liquid- or gas-phase processes.

Although MCPs themselves are well known in the art of radiation and electron detection, their use as a substrate for energy-storage devices is novel. Because of the processes by which MCPs are made—by fusing together multiple tubes—they can be made with very small channel diameters, high channel density and high channel aspect ratio. As a result, MCP-based microbatteries have a larger electrode area/volume ratio, and thus higher electrical capacity, than microbatteries known in the art, such as those described in the above-mentioned U.S. Pat. No. 6,197,450. The principles of the present invention may similarly be applied to other types of electrical storage cells, such as energy-storage capacitors. The term "microbattery" as used herein simply denotes small-scale electrical batteries, in which certain features of the present invention are particularly advantageous, but the principles of the present invention are generally applicable to batteries and other electrical storage cells regardless of scale.

There is therefore provided, in accordance with an embodiment of the present invention, an electrical energy storage device, including:

a microchannel plate (MCP) having channels formed therein, the channels having surface areas; and thin films formed over the surface areas and defining an anode, a cathode, and a solid electrolyte disposed between the anode and the cathode.

Typically, the MCP includes a plurality of tubes, which are fused together and cut to define the MCP, the tubes having lumens, which define the channels. In disclosed embodiments, the tubes may include glass or carbon. The MCP may include a non-conductive material or a conductive material.

In disclosed embodiments, the MCP has top and bottom surfaces, and the thin films are further formed over at least one of the top and bottom surfaces.

In some embodiments, the thin films include at least one current collector layer, such as nickel or copper.

Typically, the solid electrolyte includes a hybrid polymer electrolyte.

In disclosed embodiments, one of the anode and the cathode includes a lithium compound. Additionally or alternatively, the cathode may include a sulfur compound.

The thin films may be fabricated so as to define a primary battery or a rechargeable battery, such as a Li-ion rechargeable battery There is also provided, in accordance with an embodiment of the present invention, an electrical energy storage device, including:

a substrate having a multiplicity of cavities formed therein, the cavities having an aspect ratio greater than one and having surface areas; and thin films formed over the surface areas and defining an anode, a cathode, and a solid electrolyte disposed between the anode and the cathode, the thin films including a final layer, which is formed so as to fill the channels.

The substrate may include at least one of a non-conductive material, a semiconductor material, and a conductive material. Typically, the substrate has top and bottom surfaces, and the cavities are formed so as to pass through the substrate from the top to the bottom surface.

There is additionally provided, in accordance with an embodiment of the present invention, an electrical energy storage device, including:

a substrate having a multiplicity of cavities formed therein, the cavities having an aspect ratio greater than one and having surface areas, the substrate defining a first electrode; and thin films formed over the surface areas and defining a second electrode and a solid electrolyte disposed between the first and second electrodes.

In some embodiments, the first electrode includes an anode, and the second electrode includes a cathode. In other embodiments, the first electrode includes a cathode, and the second electrode includes an anode.

In disclosed embodiments, the substrate includes a carbon material, such as diamond.

There is further provided, in accordance with an embodiment of the present invention, an electrical energy storage device, including:

a tube, having a channel passing therethrough, the channel having a surface area; and thin films formed over the surface area and defining an anode, a cathode, and a solid electrolyte disposed between the anode and the cathode.

There is moreover provided, in accordance with an embodiment of the present invention, a microelectronic device, including:

a substrate;

a microcircuit disposed on the substrate; and a microbattery disposed on the substrate and coupled to provide electrical power to the microcircuit, the microbattery including:

a microchannel plate (MCP) having channels formed therein, the channels having surface areas; and thin films formed over the surface areas and defining an anode, a cathode, and a solid electrolyte disposed between the anode and the cathode.

There is furthermore provided, in accordance with an embodiment of the present invention, a microelectronic device, including:

a microchannel plate (MCP) having channels formed therein, the channels having surface areas;

a microcircuit disposed on the MCP; and thin films formed over the surface areas of at least some of the channels and defining an anode, a cathode, and a solid electrolyte disposed between the anode and the cathode, the thin films being coupled to provide electrical power to the microcircuit.

There is also provided, in accordance with an embodiment of the present invention, a microelectronic device, including:

a microcircuit;

a substrate having a multiplicity of cavities formed therein, the cavities having an aspect ratio greater than one and having surface areas; and thin films formed over the surface areas and defining an anode, a cathode, and a solid electrolyte disposed between the anode and the cathode, the thin films including a final layer, which is formed so as to fill the channels, the thin films being coupled to provide electrical power to the microcircuit.

In a disclosed embodiment, the microcircuit is disposed on the substrate.

There is additionally provided, in accordance with an embodiment of the present invention, a microelectronic device, including:

a device substrate;

a microcircuit disposed on the device substrate; and a microbattery disposed on the device substrate and coupled to provide electrical power to the microcircuit, the microbattery including:

a battery substrate having a multiplicity of cavities formed therein, the cavities having an aspect ratio greater than one and having surface areas, the substrate defining a first electrode; and thin films formed over the surface areas and defining a second electrode and a solid electrolyte disposed between the first and second electrodes.

There is further provided, in accordance with an embodiment of the present invention, a microelectronic device, including:

a substrate having a multiplicity of cavities formed therein, the cavities having an aspect ratio greater than one and having surface areas, the substrate defining a first electrode;

a microcircuit disposed on the substrate; and thin films formed over the surface areas of at least some of the channels and defining a second electrode and a solid electrolyte disposed between the first and second electrodes, the thin films and substrate being coupled to provide electrical power to the microcircuit.

There is moreover provided, in accordance with an embodiment of the present invention, a method for fabricating an electrical storage cell, including:

providing a microchannel plate (MCP) having channels formed therein, the channels having surface areas; and forming thin films over the surface areas so as to define an anode, a cathode, and a solid electrolyte disposed between the anode and the cathode.

There is furthermore provided, in accordance with an embodiment of the present invention, a method for fabricating an electrical storage cell, including:

providing a substrate having a multiplicity of cavities formed therein, the cavities having an aspect ratio greater than one and having surface areas; and forming thin films over the surface areas so as to define an anode, a cathode, and a solid electrolyte disposed between the anode and the cathode, the thin films including a final layer, which is formed so as to fill the channels.

There is also provided, in accordance with an embodiment of the present invention, a method for fabricating an electrical storage cell, including:

providing a substrate having a multiplicity of cavities formed therein, the cavities having an aspect ratio greater than one and having surface areas, the substrate defining a first electrode; and forming thin films over the surface areas so as to define a second electrode and a solid electrolyte disposed between the first and second electrodes.

There is additionally provided, in accordance with an embodiment of the present invention, a method for fabricating an electrical storage cell, including:

providing a tube having a channel passing therethrough, the channel having a surface area; and forming thin films over the surface area so as to define an anode, a cathode, and a solid electrolyte disposed between the anode and the cathode.

The present invention will be more fully understood from the following detailed description of the embodiments thereof, taken together with the drawings in which:

DETAILED DESCRIPTION OF EMBODIMENTS

Figure 1:
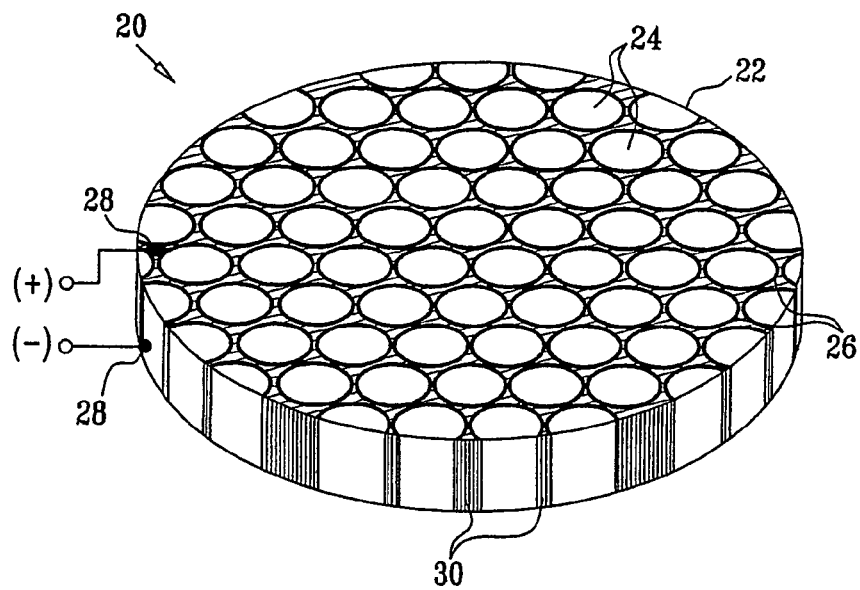
FIG. 1 is a schematic, pictorial illustration of a MCP-based battery, in accordance with an embodiment of the present invention.

FIG. 1 is a schematic, pictorial illustration of a MCP-based battery 20, in accordance with an embodiment of the present invention. Battery 20 comprises a MCP 22, which serves as the substrate for the battery. The MCP may comprise a non-conductive material, such as glass or quartz, or alternatively a conductive material, such as a suitable form of carbon. Any suitable method known in the art may be used in fabricating MCP 22, such as the methods described above in the Background of the Invention and in the patents cited therein.

MCP 22 comprises a matrix of channels 24, separated by channel walls 30. Typically, the aspect ratio of channels 24 is greater than one, and MCP 22 contains thousands or even millions of channels. For clarity of illustration, however, the diameter of channels 24 has been exaggerated in the figures, relative to the overall diameter and thickness of MCP 22. In MCPs of this type that are currently known in the art, channels 24 may have diameters in a range from less than 1 µm up to about 50 µm, and constitute at least 50% (and frequently more than 50%) of the cross-sectional area of the MCP. The overall diameter of the MCP may typically range from 1 mm to more than 100 mm, with a thickness from 0.5 mm up to 10 mm. These dimensions are cited only by way of example, however, and the principles of the present invention may be applied in producing batteries based on MCP substrates of smaller or larger dimensions.

As noted above, MCP 22 is formed by bonding together multiple tubes, wherein the lumens of the tubes define channels 24. In the embodiment shown in FIG. 1, the tubes are stacked in a hexagonal configuration, and the walls of the tubes are fused together to form a unitary, continuous wall structure, in which the individual walls of the original tubes are no longer distinguishable one from another. This configuration is common to most commercially-available MCPs.

Alternatively, other MCP configurations may be also used as substrates for device 20. For example, the MCP may comprise a bundle of tubes whose walls still remain distinct after having been bonded together, with additional cavities in the spaces between the walls. Although MCP 22 is shown as having a circular configuration, with hexagonal packing of channels 24, the MCP may alternatively be made in any suitable configuration known in the art. For example, the MCP may be cut in a square or other rectangular shape, and/or the channels may be arranged in a square or rectangular matrix or in a random pattern. The shape and thickness of the MCP substrate may be determined arbitrarily simply by cutting the MCP material to the desired dimensions. Furthermore, for applications requiring extreme miniaturization, the principles of the present invention may be applied to form a microbattery within a bundle of just a few tubes, or even in a single tube.

Figure 2:
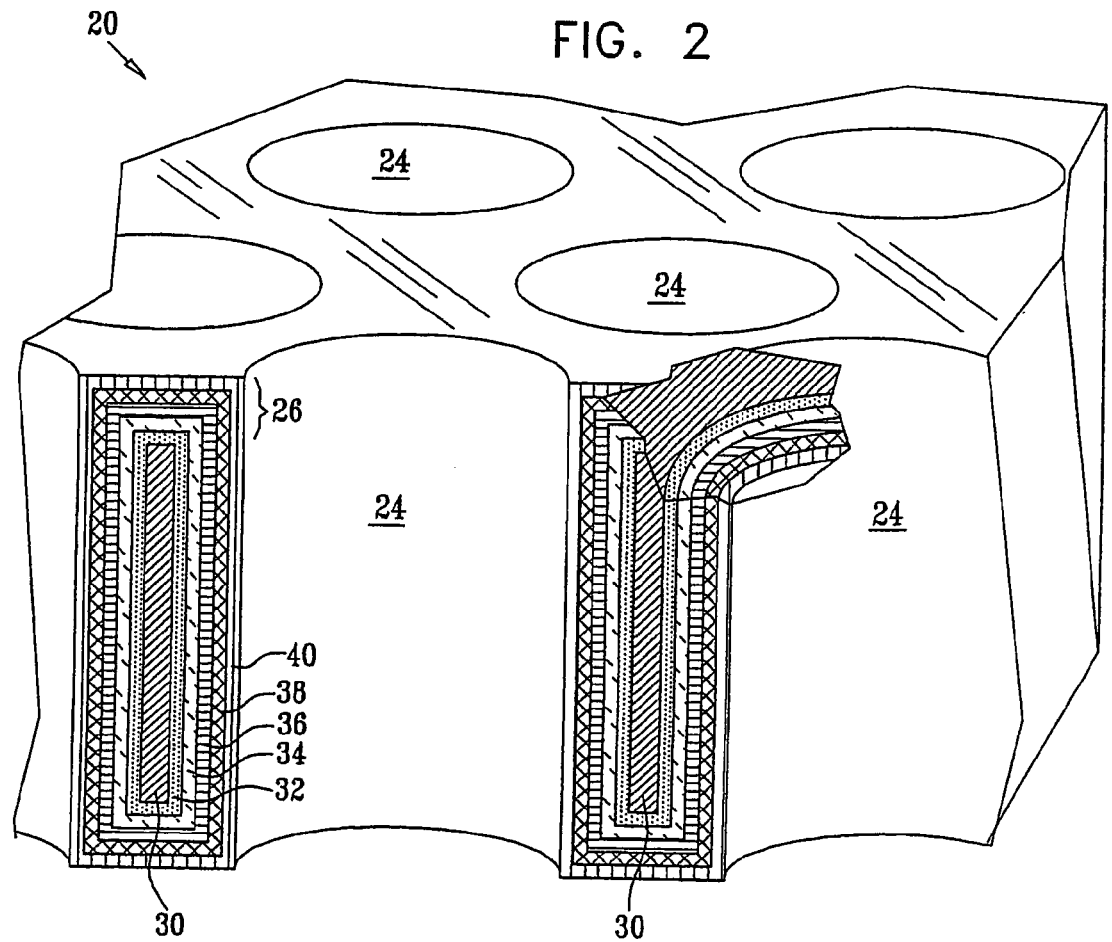
FIG. 2 is a schematic, cutaway view showing details of thin film layers in a MCP-based battery, in accordance with an embodiment of the present invention.
Figure 3:
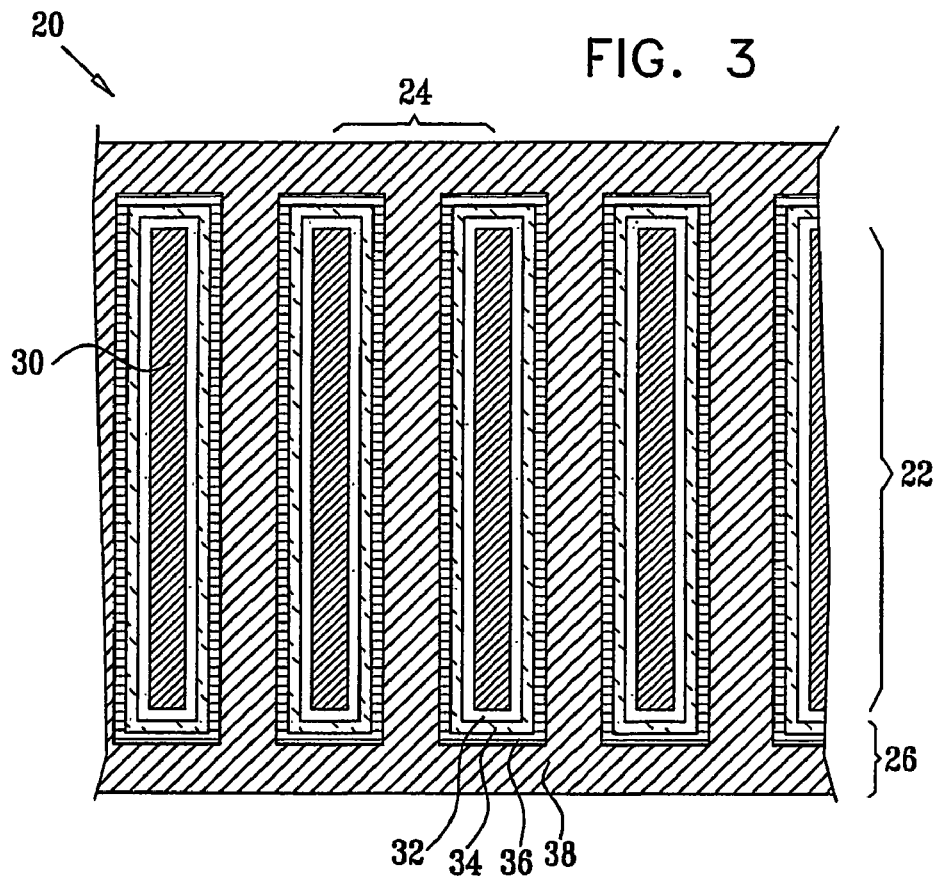
FIG. 3 is a schematic, sectional view of a portion of a MCP-based battery, in accordance with an embodiment of the present invention.

Channels 24 are filled with a multi-layer thin film structure 26, comprising electrodes, a solid electrolyte and possibly additional layers, as well. Some exemplary structures and materials are described hereinbelow. Structure 26 may fill the entire volume of channels 24, as shown in FIG. 1, as well as in FIG. 3, or the thin film layers may only coat the interior of walls 30 while leaving the centers of the channels open, as shown in FIG. 2. (FIGS. 2 and 3 are described in greater detail hereinbelow.) Typically, thin film structure 26 also coats one or both of the upper and lower surfaces of MCP 22, so that the layers are contiguous over the entire MCP.

The electrical power output of battery 20 is provided at terminals 28, which are respectively coupled (optionally through current collector layers) to the cathode and anode layers of the thin film structure. (The designation of positive and negative terminals in the figure is arbitrary and may be reversed, depending on the order of layers in structure 26.) The contiguity of structure 26 over the upper and/or lower surface of the MCP permits the use of terminals 28 as a common contact for the thin film layers over the entire MCP. Alternatively, other electrical schemes may be used to contact the thin film layers in the individual channels of the MCP, as will be apparent to those skilled in the art. Battery 20 may be designed for use as either a primary or secondary (rechargeable) battery, depending on the composition of the layers in structure 26.

FIG. 2 is a schematic, cutaway view of battery 20 showing details of thin film structure 26 in the interior of channels 24, in accordance with an embodiment of the present invention. The relative thickness of the thin film layers is exaggerated in the figure for clarity of illustration. It can be seen in the figure that the layers both cover the interior walls of channels 24 and extend over the upper and lower surfaces of the MCP. The thin film layers may be deposited using any suitable processes known in the art, such as wet processes or chemical vapor deposition (CVD) processes. Some specific fabrication examples are described hereinbelow.

In the embodiment shown in FIG. 2, a current collector layer 32 is deposited over the MCP substrate and thus coats wall 30. An electrode layer 34, which may be either the anode or the cathode of battery 20, is deposited over current collector layer 32. Alternatively, the current collector layer may be eliminated if electrode layer 34 is capable of serving the current collection function (as in Example 1 below), or if wall 30 is itself made of conductive material, such as a suitable form of carbon. In an alternative embodiment, described below in Example 4, the MCP substrate also serves as one of the electrodes, such as the anode. In this case, both layer 32 and layer 34 may be eliminated from structure 26.

Electrode layer 34 is overlaid by an electrolyte layer 36, typically a solid electrolyte in a polymer matrix. A second (cathode or anode) electrode layer 38 is formed over electrolyte layer 36. If necessary, electrode layer 38 is followed by another (optional) current collector layer 40. Alternatively, if electrode layer 38 is sufficiently conductive (for example, if layer 38 comprises a graphite anode), current collector layer 40 is not required.

FIG. 3 is a schematic, sectional illustration of battery 20, showing details of thin film structure 26, in accordance with another embodiment of the present invention. In this embodiment, layers 32, 34 and 36 are deposited in succession on walls 30 and on the upper and lower surfaces of MCP 22. The final layer—in this case, electrode layer 38—is then deposited so as to completely fill channels 24, as well as coating the top and bottom of the MCP. (In this embodiment, it is assumed that layer 38 comprises a conductive material, such as graphite, so that current collector layer 40 is not required.) The thickness of thin film layers 32, 34 and 36 in this figure is again exaggerated for clarity of illustration. In a typical embodiment, walls 30 are about 10 µm thick, while channels 24 are initially 50 µm in diameter. The thickness of each of layers 32, 34 and 36 is between about 0.5 µm and 5 µm, and layer 38 fills the remainder (roughly 80%) of the channel volume. Because the layers are all contiguous, terminal 28 may contact either inner electrode layer 34 or the adjoining collector layer 32 or walls 30 at an opening left in the outer layers at the outer surface of battery 30.

Filling channels 24 in this manner maximizes the total volume of active material in battery 20 relative to the dimensions of the MCP substrate. This sort of complete filling is useful not only in MCP-based batteries, but also in other sorts of three-dimensional storage cells that are built on a substrate with multiple cavities, such as the substrates described in the above-mentioned U.S. Pat. No. 6,197,450.

A number of specific examples of microbatteries based on principles of the present invention will now be described. Examples 1-3 below use as their substrate a round soda-lime glass MCP (Burle Electro-Optics, part no. C13S05M50), with an external diameter of 13 mm, active area diameter of 9 mm, thickness of 0.5 mm, and channels 50 µm in diameter. (The "active area" is the part of the MCP in which the microchannels are accessible, while the outer portion of the MCP is covered by a mounting flange.) All of these examples are cited as an aid to understanding of possible implementations of the present invention, and should not be understood as limiting the scope of the present invention in any way. Other materials that may be used in the various layers of three-dimensional thin-film microbatteries are described in the above-mentioned U.S. Pat. No. 6,197,450.

EXAMPLE 1

A rechargeable electrochemical cell (MCP-based battery), comprising a lithium-ion anode, hybrid polymer electrolyte (HPE) and $MoS_2$ cathode was assembled on a glass MCP substrate as described above. Prior to coating of the substrate with a Ni current collector, in order to remove possible organic residues, the glass substrate was immersed in acetone, and degreased in a weak base solution of 100-200 g/L NaOH for 5 min. After rinsing in deionized water, the substrate was etched in a $NH_4F$:HF solution for 2 min to increase roughness and to improve the adhesion of the nickel to the glass substrate. The surface catalyzation was accomplished in a $PdCl_2$:$SnCl_2$:HCl:KCl solution at room temperature for 3-10 min. The composition of this solution was as follows, (g/L): 1-10 $PdCl_2$; 30-100 $SnCl_2$*$2H_2O$; 25-120 HCl; 80-100 KCl. An electroless process, which is known to provide conformal deposits, was chosen to coat the Ni current collector inside the glass channels and on the top and bottom of the substrate. The plating solution was composed of a mixture of $NiSO_4$ as the main nickel source, $NaH_2PO_2$ as the reducing agent, and CH3COONa as a buffer and a mild Ni complexing agent. A fresh plating solution (pH=10-11, 70° C.) was used for each experiment in order to keep the nickel concentration constant and to avoid contamination. The thickness of the Ni deposit is a function of time and can be varied.

A 0.3-1 µm thick $MoS_2$ cathode was prepared by reduction of $MoS_4^{2-}$ ions on the freshly nickel-coated MCP substrate. Deposition of $MoS_2$ was carried out from aqueous solution of 0.05 M tetrathiomolybdate. Potassium chloride (0.1 M) was the supporting electrolyte. Electrodeposition was carried out at room temperature. The electrodeposition was accomplished under a constant current density of 10 mA/cm$^2$ for 4 min. The deposited samples were thoroughly rinsed in deionized water and vacuum-dried at elevated temperature.

The chosen polymer for the hybrid polymer electrolyte (HPE) was a commercially-available PVDF-2801 copolymer (Kynar). The PVDF powder was dissolved in high-purity cyclopentanone (Aldrich). Fumed silica 130 (Degussa) and propylene carbonate (PC, Merck) were added, and the mixture was stirred at room temperature for about 24 hours to get a homogeneous slurry. After complete dissolution, the slurry was cast on the MCP substrate. To promote conformal filling of the holes, several sequential steps, including vacuum and spinning, were used. The thickness of the HPE was on the order of 1-5 µm. After evaporation of the cyclopentanone, the three-layer coated substrate was dried in vacuum to ensure complete evaporation of the solvent.

Lithiated graphite was prepared using a process of chemical lithiation with n-butyl lithium, as described, for example, by Hashikawa et al., in "Lithium Isotope Effect Accompanying Chemical Insertion of Lithium into Graphite," *Zeitschrift fur Naturforschung* 57a (2002), pages 857-862, which is incorporated herein by reference. The resulting powder was mixed with polystyrene and dissolved in toluene to get a viscous homogeneous slurry, which was inserted into the channels and spread on the planar surfaces by vacuum and spinning. Finally, the MCP substrate with the sandwich-like structure composed of nickel current collector, molybdenum sulfide cathode, hybrid polymer electrolyte and lithiated graphite anode was soaked in 1 M Li imide-ethylene carbonate (EC):dimethyl carbonate (DMC) 1:1 (v/v) based electrolyte.

The resulting Li-ion/HPE/$MoS_2$-MCP battery was inserted into a coin cell and cycled at room temperature using a Maccor (Tulsa, Okla.) Series 2000 battery test system. The voltage cut-off was 1.3 to 2.4 V; the charge/discharge current density varied between 10 and 100 µA/cm$^2$. The Li/HPE/$MoS_2$ cell delivered above 860 µAh per cycle at 100 µA/cm$^2$ for over 200 reversible cycles, with a capacity fade of 0.05%/cycle. The Faradic efficiency was close to 100%.

EXAMPLE 2

A MCP-based battery was prepared on the same substrate as described above. Deposition of a nickel current collector was carried out in $NiSO_4$:$NaH_2PO_2$:EDTA with pH=10, at elevated temperature (90° C.) for 5 min. The cathode was prepared as in Example 1. PEO (10% w/w) was used as a binder in a composite lithiated graphite anode. The MCP substrate with the sandwich-like structure was soaked in a 1 M LiI-tetraglyme:10% ethylene carbonate (EC) (v/v) based electrolyte.

The resulting Li-ion/HPE/$MoS_2$ battery was cycled at room temperature and at current density 50 µA/cm$^2$. The voltage cutoff on discharge was 1.3 V. The voltage cutoff on charge was 2.4 V. The cell went through over 40 reversible cycles (100% depth of discharge), and the degree of degradation did not exceed 0.1%/cycle.

EXAMPLE 3

Electrolessly-deposited copper was used as a cathode current collector. The solution for electroless copper deposition consisted of (g/L): 10-15 $CuSO_4$x$5H_2O$, 10-15 NaOH, 2-3$NiCl_2$x$H_2O$, 0.001 $Na_2S_2O_8$, and 15-25 mL/L HCOH (37%). At pH 12.2 and 20 min deposition time, the thickness of the Cu layer was about 2-2.5 μm. This copper layer was electro-oxidized in an aqueous solution of polysulfides (mixture of 10 mM $Na_2S$, 0.1 M NaOH and elemental sulfur) at a constant current of 0.1-0.5 $mA/cm^2$-for 0.5 min.

The resulting $Li/HPE/Cu_2S$ cell went through over 40 reversible cycles, and the degree of degradation did not exceed 0.8%/cycle.

EXAMPLE 4

In this example, the battery substrate is assumed to comprise a conductive material, such as a suitable form of carbon. For instance, the substrate may comprise a carbon MCP as described in the above-mentioned U.S. Pat. No. 6,270,714. Alternatively, a diamond substrate with an array of cavities may be used, as described in U.S. Pat. No. 6,521,149, whose disclosure is incorporated herein by reference. (Although this patent refers to such a structure as a "free-standing solid diamond MCP," it is not a MCP as defined in the present patent application, since it is not formed from multiple tubes.)

The conductive substrate serves both as a current collector and anode. The substrate may be coated by a HPE membrane as described in Example 1. The remaining cavity may then be filled by a slurry of lithiated cobalt oxide (or other nano-size lithiated cathode material) with 10% w/w styrene as a binder. This sandwiched structure with a cathode current collector may serve as a high-energy density microbattery.

Figure 4:
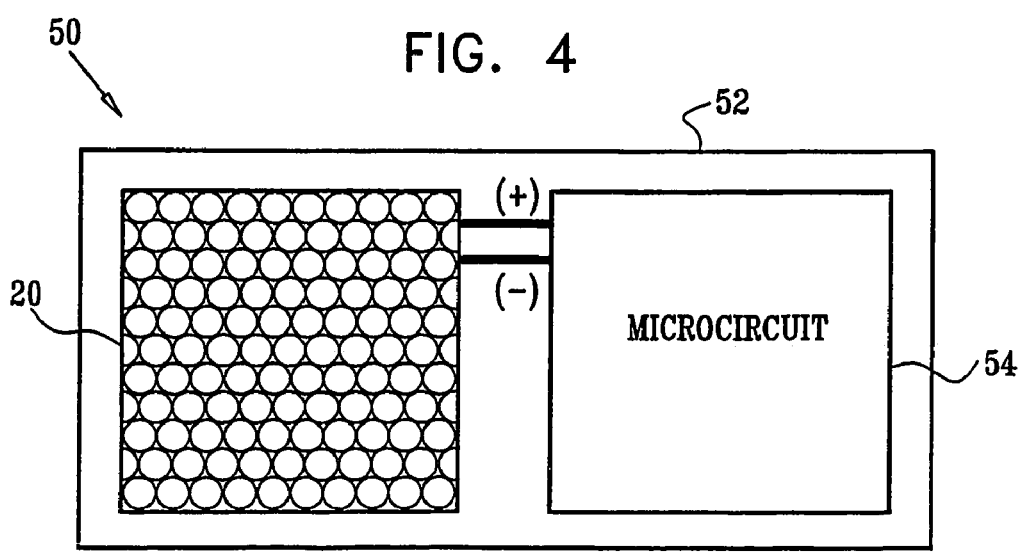
FIG. 4 is a schematic top view of an integrated microelectronic device including a microbattery, in accordance with an embodiment of the present invention.

FIG. 4 is a schematic top view of an integrated microelectronic device 50, which includes battery 20, configured as a microbattery, in accordance with an embodiment of the present invention. Device 50 comprises a substrate 52, with a microcircuit 54 formed on a portion of the substrate. Microbattery 20 is likewise mounted on substrate 52 and supplies power to microcircuit 54. In one embodiment, substrate 52 comprises a semiconductor material, such as silicon, on which microcircuit 54 is formed by lithographic processes, as are known in the art. In this case, microbattery 20 is typically produced separately on a suitable MCP and is then bonded to the substrate.

In another embodiment, substrate 52 comprises a glass material, as is used, for example, in bio-chips and some micro-electro-mechanical system (MEMS) devices. In this case, microbattery 20 may be produced on a glass MCP and then fused or otherwise bonded to the substrate. Alternatively, substrate 52 itself may comprise a MCP, to which microcircuit 54 is bonded. Further alternatively, substrate 52 may comprise plastic, ceramic and/or metal materials, as are used in chip carriers, chip packages and various hybrid devices that are known in the art.

Although microbattery 20 is shown in FIG. 4 to be mounted beside microcircuit 54, the microbattery may alternatively be mounted above or below the microcircuit, on the same side of substrate 52 or on the opposite side. Furthermore, microbattery 20 may be round (as shown in FIG. 1) or may have another shape that is convenient in terms of the packaging requirements of device 50.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An electrical energy storage device, comprising:
    a substrate having a multiplicity of cavities formed therein, the cavities having an aspect ratio grater than one and having surface areas, the substrate comprising a microchannel plate (MCP) having channels serving as the cavities formed therein; and
    thin film formed over the surface areas and defining an anode, a cathode, and a solid electrolyte disposed between the anode and the cathode, the thin films comprising a final layer, which is formed so as to fill the cavities.

2. The device according to claim 1, wherein the MCP comprises a plurality of tubes, which are fused together and cut to define the MCP, the tubes having lumens, which define the channels.

3. The device according to claim 1, wherein the substrate comprises at least one of a non-conductive material, a semiconductor material and a conductive material.

4. The device according to claim 1, wherein the substrate has top and bottom surfaces, and wherein the cavities are formed so as to pass through the substrate from the top to the bottom surface.

5. The device according to claim 1, wherein the substrate has top and bottom surfaces, and wherein the thin films are further formed over at least one of the top and bottom surfaces.

6. The device according to claim 1, wherein the thin films comprise at least one current collector layer.

7. The device according to claim 1, wherein the solid electrolyte comprises a hybrid polymer electrolyte.

8. An electrical energy storage device, comprising:
    a tube forming part of a microchannel plate (MCP), the tube having a channel passing therethrough, the channel having a surface area; and
    thin films formed over the surface area and defining an anode, a cathode and a solid electrolyte disposed between the anode and the cathode.

9. A microelectronic device, comprising:
    a microcircuit;
    a substrate having a multiplicity of cavities formed therein, the cavities having an aspect ratio greater than one and having surface areas, the substrate comprising a microchannel plate (MCP) having channels serving as the cavities formed therein; and
    thin films formed over the surface areas and defining an anode, a cathode, and a solid electrolyte disposed between the anode and the cathode, the thin films comprising a final layer, which is formed so as to fill the cavities, the thin films being coupled to provide electrical power to the microcircuit.

10. The device according to claim 9, wherein the microcircuit is disposed on the substrate.

11. A method for fabricating an electrical storage cell, comprising:
    providing a substrate having a multiplicity of cavities formed therein, the cavities having an aspect ratio greater than one and having surface areas, the substrate comprising a microchannel plate (MCP) having channels serving as the cavities; and
    forming thin films over the surface areas so as to define an anode, a cathode and a solid electrolyte disposed between the anode and the cathode, the thin films comprising a final layer, which is formed so as to fill the cavities.

12. The method according to claim 11, wherein the MCP comprises a plurality of tubes, which are fused together and cut to define the MCP, the tubes having lumens, which define the channels.

13. The method according to claim 11, wherein the substrate comprises at least one of a non-conductive material, a semiconductor material and a conductive material.

14. The method according to claim 11, wherein the substrate has top and bottom surfaces, and wherein the cavities are formed so as to pass through the substrate from the top to the bottom surface.

15. The method according to claim 11, wherein the substrate has top and bottom surfaces, and wherein forming the thin films further comprises forming the thin films over at least one of the top and bottom surfaces.

16. The method according to claim 11, wherein the thin films comprise at least one current collector layer.

17. The method according to claim 11, wherein the solid electrolyte comprises a hybrid polymer electrolyte.

18. A method for fabricating an electrical storage cell, comprising:

providing a tube having a cannel passing therethrough, the channel having a surface area, the tube forming part of a microchannel plate (MCP); and forming thin films over the surface area so as to define an anode, a cathode, and a solid electrolyte disposed between the anode and the cathode.

\* \* \* \* \*

UNITED STATES PATENT AND TRADEMARK OFFICE
CERTIFICATE OF CORRECTION

| | | |
|---|---|---|
| PATENT NO. | : 7,527,897 B2 | Page 1 of 1 |
| APPLICATION NO. | : 10/595365 | |
| DATED | : May 5, 2009 | |
| INVENTOR(S) | : Menachem Nathan et al. | |

It is certified that error appears in the above-identified patent and that said Letters Patent is hereby corrected as shown below:

On the Title Page, Item (86)

For the filing or '371 c' date, delete "June 28, 2006" and insert --June 27, 2006--

Signed and Sealed this

Twenty-seventh Day of October, 2009

David J. Kappos
*Director of the United States Patent and Trademark Office*